United States Patent Office.

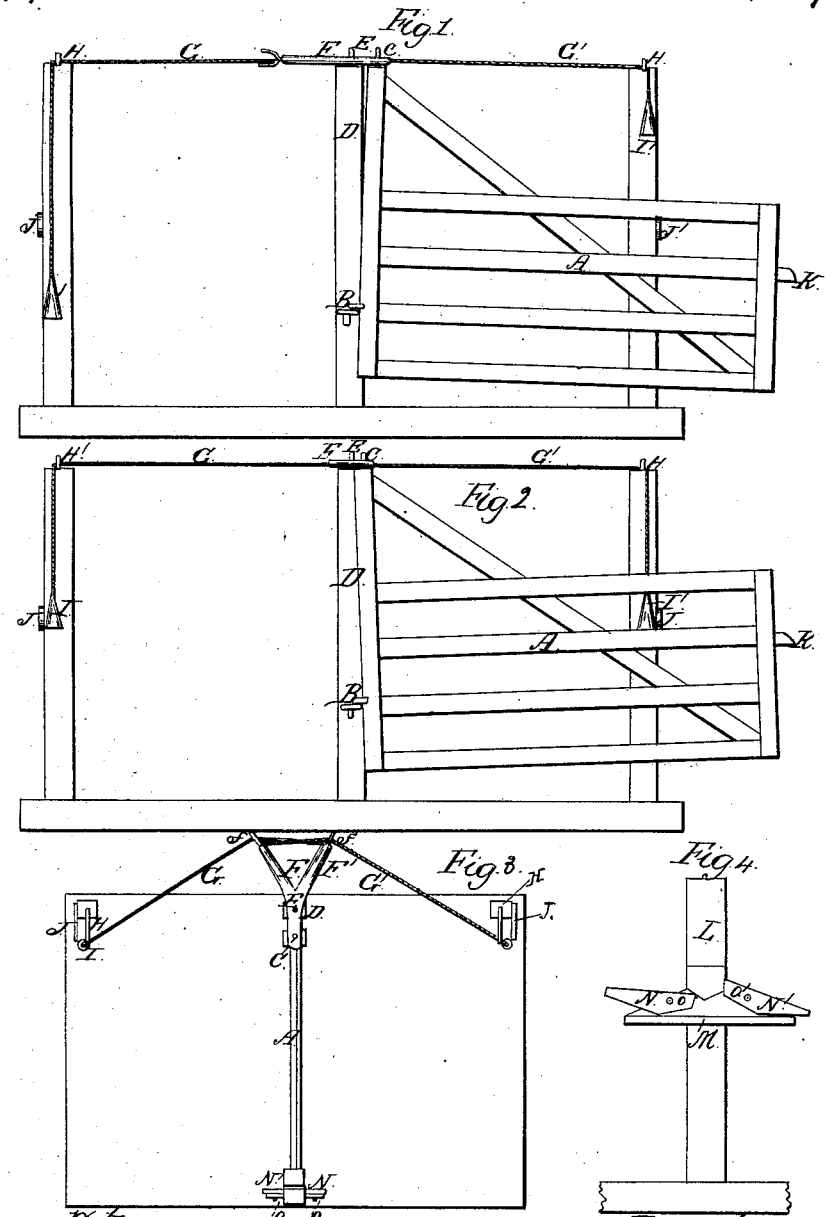

DANIEL FLINT, OF SACRAMENTO, CALIFORNIA.

Letters Patent No. 69,788, dated October 15, 1867.

---

IMPROVEMENT IN GATES.

---

The Schedule referred to in these Letters Patent and making part of the same.

---

TO ALL WHOM IT MAY CONCERN:

Be it known that I, DANIEL FLINT, of Sacramento, county of Sacramento, State of California, have invented an Improved Gate; and I do hereby declare the following description and accompanying drawings are sufficient to enable any person skilled in the art or science to which it most nearly appertains to make and use my said invention or improvement without further invention or experiment.

The nature of my invention is to provide an improved gate so constructed and arranged that it may be opened and closed without alighting; and consists of so balancing the gate and attaching it at an angle to the post upon which it hangs, that by pulling cords to which weights are attached the gate will open and close.

To do this I employ any common single gate, having a high swinging post, which is hinged to a main stationary post by a hook and eye, the top of which is even with the main post. A crotch is attached loosely by vertical pins to the top of the main and gate-posts, allowing it to swing to and fro as the gate opens and shuts. To the ends of the crotch are connected forked arms to which cords are attached, passing through stationary rings placed in posts at the right and left of the gate. On the centre or latch-post upon a horizontal cross-bar are placed two automatic catches, with a sufficient space between to hold the latch.

To more fully illustrate and describe my invention, reference is had to the accompanying drawings and letters marked thereon, of which—

Figure 1 is a view of the gate open.
Figure 2 is a view of the gate balanced for closing.
Figure 3 is a plan showing the gate closed.
Figure 4 is a view of the latch-post with automatic catches.

A represents a gate of simple construction, having a high hinge post, A', below the centre of which is placed a hook, B, which works in an eye in the stationary post D. The tops of these posts are flush with each other, and upon them is placed a crotch, F and F', with small forked arms $ff$ by vertical pins E C, allowing the crotch to play loosely around the pins. Cords G and G' are attached back of each forked arm, so the cord attached to the right arm of the crotch passes through both forks to the post H, operating in an eye or pulley, and precisely in the same manner is the cord G attached to the left arm of the crotch, passing through an eye of the post H at the right hand, so that when the gate is closed these cords are parallel to each other in the forks. Weights I and I' are attached to each of the cords. The latch-post L is placed on a line with the post D, and has a bar, M, placed at right angles to it. To this bar are attached the automatic catches N and N' by pins $o$ and $o'$.

In the operation of my gate the construction of these catches is such that as the gate closes, the latch K with its projecting end bears down the incline ends, and confines the gate by the latch between the two catches N N', and by pulling either cord the gate opens from the operator, and swings back against the posts H and H' where it is held by the catch J or J', and at which position the crotch is on a line with the gate. When the gate is open it rests at an angle in the catch on the post, so that the gate is a little below the horizontal, and the top of the gate-post A' hangs at an angle a little from the perpendicular to the corners of the post D, and by a slight effort in pulling the cord the gate is easily lifted from the catch by means of the great leverage obtained by the crotch and forks to which the cords are attached, and the gate swings back and is latched. In order to allow the gate to swing clear of the horse and carriage, another post may be placed at each side of the gate, making five instead of three posts, with the cords and weights carried to them, and thus permitting it to open in the opposite direction to the approach free from impediment.

Having thus described my invention, what I claim, and desire to secure by Letters Patent, is—

The combination and arrangement of a crotched hinge, F, with forked arms and the cords G G', and weights I I', with the automatic catches N N', all substantially as described and for the purposes set forth.

In witness whereof I have hereunto set my hand and seal.

DANIEL FLINT. [L. S.]

Witnesses:
   C. W. M. SMITH,
   JOHN Q. ADAMS.